Nov. 12, 1968 R. E. WOOD 3,411,119

ELECTRONIC COMPONENTS WITH RESILIENT SPACER

Filed Dec. 29, 1966

INVENTOR.
RAYMOND E. WOOD

BY Hill, Sherman, Meroni, Gross & Simpson ATTORNEYS 3,411,119
ELECTRONIC COMPONENTS WITH RESILIENT SPACER

Raymond E. Wood, Palatine, Ill., assignor to TRW Inc., Cleveland, Ohio, a corporation of Ohio Filed Dec. 29, 1966, Ser. No. 605,670
9 Claims. (Cl. 335—210)

ABSTRACT OF THE DISCLOSURE

A resilient spacer element for electronic assemblies consisting of a wafer-type element having integral flexible fingers struck therefrom and extending beyond the plane of the wafer to provide for taking up manufacturing tolerances and, in some applications, to provide braking pressure between the elements.

*Disclosure*

The present invention relates to electronic component assemblies having improved resilient spacer elements included therein, and to the spacer elements themselves.

Electronic components, particularly electromagnetic components, frequently require the inclusion of a spacer element to take up manufacturing tolerances and also to provide braking friction between the parts. A typical example of such a component is a convergence coil assembly used in association with a color television tube. In the past, with assemblies of this type, the spacer element usually took the form of a spring which was nonmagnetic and which had an undulating configuration. Generally, the nonmagnetic spring was composed of Phosphor bronze, a relatively expensive material.

One of the problems associated with the structures of the past employing the spring was that of difficulty in assembly. The spring element had to be manually inserted and aligned by an operator so that the use of the spring washer made up a significant part of the cost of the assembly.

The present invention provides an improved resilient spacer for electronic components, particularly of the electromagnetic type which is considerably less expensive to produce and far simpler to install in the components. The spacer element of the present invention can be made of readily available inexpensive material such as synthetic resin. In addition, the amount of labor required for assembly is significantly reduced.

One of the objects of the present invention is to provide an improved spacer element for use in electronic assemblies which is considerably less expensive than the spacers presently in use.

Another object of the invention is to provide an improved spacer element for electromagnetic components which spacer element not only takes up the manufacturing tolerances between the parts, but also may carry a permanent magnet to vary the static magnetic field in a magnetic circuit.

A further object of the invention is to provide improved electronic components wherein manufacturing tolerances are taken up, and a braking friction is provided between elements by means of an improved resilient spacer.

In accordance with the present invention, there is provided a spacer element consisting of a washer which has a thin wafer portion in which a plurality of integral, resilient fingers are struck therefrom to extend beyond the plane of the wafer. The washer is positioned between the components of the electronic assembly whereupon the fingers resiliently take up clearance existing between the components. In certain applications, the washer can also provide a braking friction between the elements which it separates.

A further description of the present invention will be in conjunction with the attached sheet of drawings which illustrates a preferred embodiment of the invention. While the drawings are confined to a showing of the use of the improved spacer element in the environment of a convergence coil assembly, it should be recognized that the spacer element finds wide use in other fields of electronic components beside the one which is specifically illustrated.

*In the drawings*

Figures 1, 2, 3:
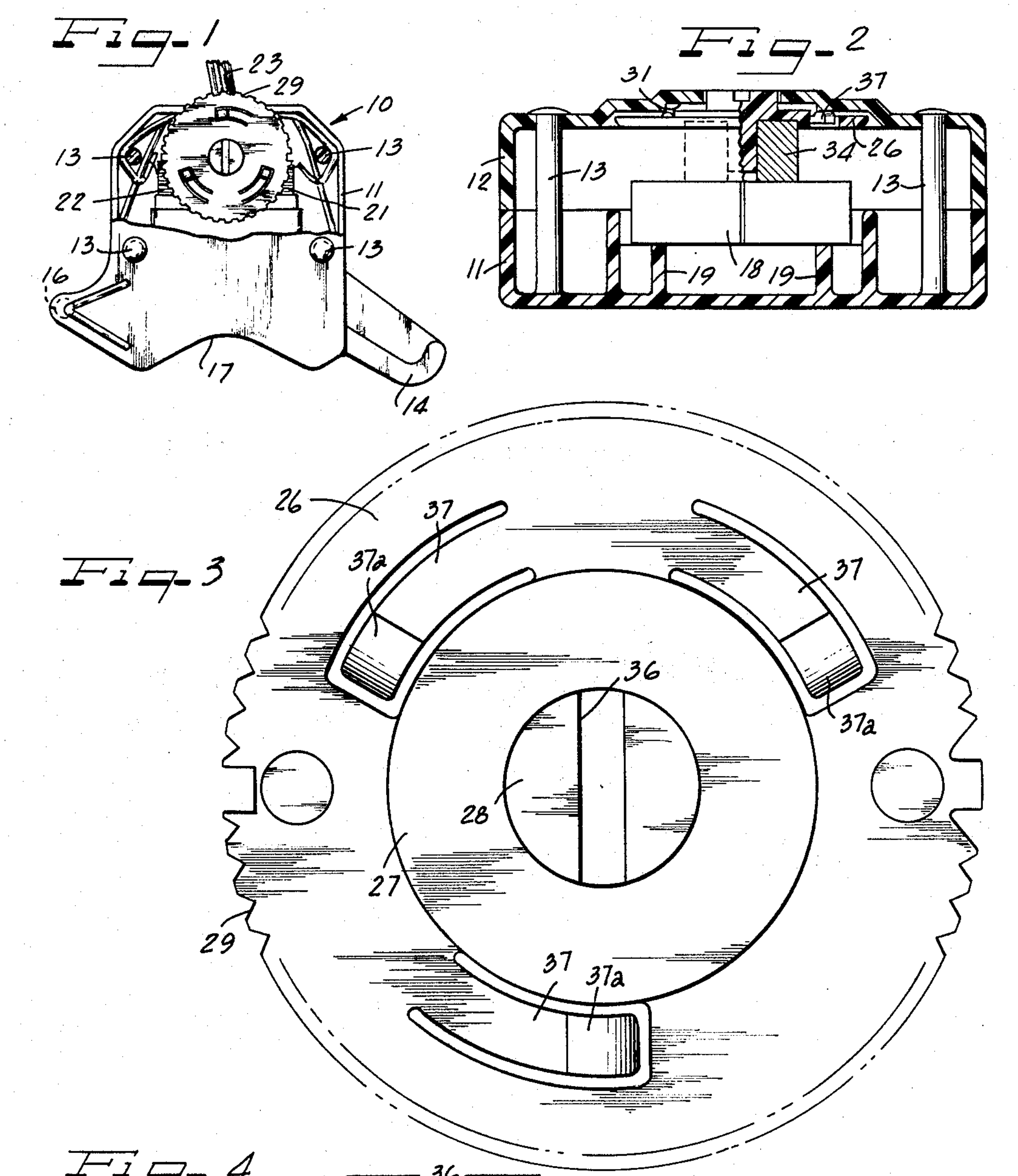
FIGURE 1 is a view in elevation, partially broken away, of a convergence coil assembly embodying the improvement of the present invention.
FIGURE 2 is an enlarged cross-sectional view of the convergence coil assembly of FIGURE 1.
FIGURE 3 is a greatly enlarged view in elevation of the resilient spacer element of the present invention.

In FIGURE 1, reference numeral 10 indicates generally one of the three (red, green and blue) coil assemblies which make up a typical convergence coil assembly for color television tubes. The coil assembly 10 includes a housing consisting of a base member 11 and a cover member 12, both composed of synthetic resinous material or the like and joined together by means of posts 13. The housing has a leg 14 extending therefrom at one end, and a pin 16 at the opposite end, to provide for coupling the three individual coil units together. The housing is relieved as indicated at reference numeral 17 to engage a portion of the neck of the cathode ray tube on which the convergence coil assembly is mounted.

Inside the housing, the coil assembly including a U-shaped magnetic core 18 which is disposed on ribs 19 formed integrally with the base section 11. The two opposed legs of the core 18 have coils 21 and 22 wound on them, with leads 23 being provided to energize the coils with the dynamic convergence signals from the television receiver circuit.

The resilient spacer element of the present invention may take the form of a thin wafer body 26 composed of a suitable nonmagnetic material such as polypropylene. The wafer body 26 has a thin hub portion 27 integral therewith, and a relatively thick hub portion 28 extending axially of the wafer.

The outer periphery of the wafer 26 has a series of peripheral notches 29 thereon to thereby provide a thumb wheel for adjustment outside the housing in which the coils are located. For this purpose, the upper casing member 12 has a slot 31 formed therein through which a portion of the periphery of the spacer element extends.

Figure 4:
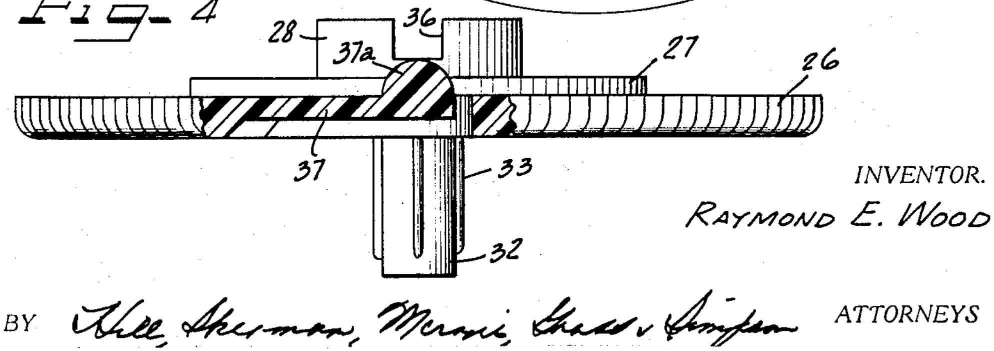
FIGURE 4 is a view partly in elevation and partly in cross-section of the improved spacer element.

The spacer element may also be provided with a depending hub portion 32 having circumferentially spaced splines 33 extending therealong, as best illustrated in FIGURE 4 of the drawings. The hub portion 32 receives an annular permanent magnet 34 which, in assembled relation, bears against the bight portion of the core 18 with the magnetic polarization of the permanent magnet 34 being such that rotation of the magnet by rotation of the spacer element serves to change the polarity and intensity of the static magnetic field which intercepts the electron beam associated with the convergence assembly. An additional means of securing the adjustment can be provided by providing a slot 36 in the hub portion 28 for receiving a screwdriver or other adjusting tool.

Manufacturing tolerances existing between the core 18 and the casing in which the core is included are taken up by providing a plurality of resilient fingers 37 in spaced relation inwardly of the periphery of the wafer 26. As best illustrated in FIGURE 4, the fingers 37 have enlarged end portions 37*a* which extend above the plane of the wafer 26. Consequently, with the wafer assembled as indicated in FIGURE 2, the enlarged end portions 37*a* bear against the upper wall of the upper casing 12 and provide a takeup of the tolerances as well as providing a braking friction between the parts.

One of the advantages of the resilient spacer element of the present invention is the ease with which it can be assembled into the coil structure. There is no bending of the spring element required nor is there a necessity to align two different types of springs with the core, as is necessary in the arrangements of the past. Assembly technique is thereby considerably simplified, and coupled with the reduced cost of the improved spacer element as compared to metallic springs, a significant saving in overall cost is achieved.

It should be understood that various modifications can be made to the described embodiments without departing from the scope of the present invention.

I claim as my invention:

1. In an electromagnetic component including a casing and a magnetic core received within said casing in spaced relation thereto, the improvement which comprises a washer including a thin wafer having a plurality of integral resilient fingers struck therefrom and extending beyond the plane of said wafer, said washer being positioned between said core and a wall of said casing whereby said fingers resiliently take up clearance existing between said core and said wall.

2. The component of claim 1 in which said washer carries a permanent magnet positioned to vary the static magnetic field of the magnetic circuit of said core.

3. The component of claim 2 in which said casing is slotted and a portion of the periphery of said washer extends through the slot permitting rotation thereof from outside said casing.

4. The component of claim 1 in which said washer is composed of a nonmagnetic synthetic resinous material.

5. The component of claim 2 in which said wafer has a depending hub on which said permanent magnet is mounted.

6. A resilient spacer for electronic components comprising a thin wafer of nonmagnetic synthetic resinous material, said wafer having a plurality of integral fingers struck therefrom leaving underlying slots in said wafer, said fingers having portions extending beyond the plane of said wafer to thereby provide flexible fingers deflectable along their lines of attachment to said slots to take up clearance between two members between which said wafer is interposed.

7. The spacer of claim 6 which also includes an integral depending hub portion.

8. The spacer of claim 6 in which said fingers are located at a radius shorter than the radius of said wafer and said fingers are generally parallel to the periphery of said wafer.

9. The spacer of claim 6 in which said fingers have enlarged end portions extending beyond the plane of said wafer.

References Cited

UNITED STATES PATENTS

| | | | |
|---|---|---|---|
| 3,188,534 | 6/1965 | Patti | 335—212 |
| 3,302,145 | 1/1967 | Schubert et al. | 335—212 |
| 3,354,337 | 11/1967 | De Both | 313—77 |

GEORGE HARRIS, *Primary Examiner.*